INVENTORS
STERLING ROBERT BROWN
CHARLES A. LEE ated June 27, 1972

United States Patent Office

3,672,952
ADHESIVELY LAMINATED KRAFT PAPER PRODUCT

Stirling Robert Brown, Oxnard, Calif., and Charles A. Lee, Knoxville, Tenn., assignors to International Paper Company, New York, N.Y.
Filed Jan. 12, 1970, Ser. No. 2,000
Int. Cl. B32b 3/00
U.S. Cl. 161—146      6 Claims

ABSTRACT OF THE DISCLOSURE

An adhesively laminated kraft paper product of improved resistance to rupture is formed from at least two superposed kraft paper webs bonded one to the other with an adhesive disposed between said webs in accordance with a selected pattern of lines. The webs are bonded together in limited regions separated by substantial unbonded regions. Each web is in a different condition of stress in a common direction in the plane of the product.

---

Figure 1:
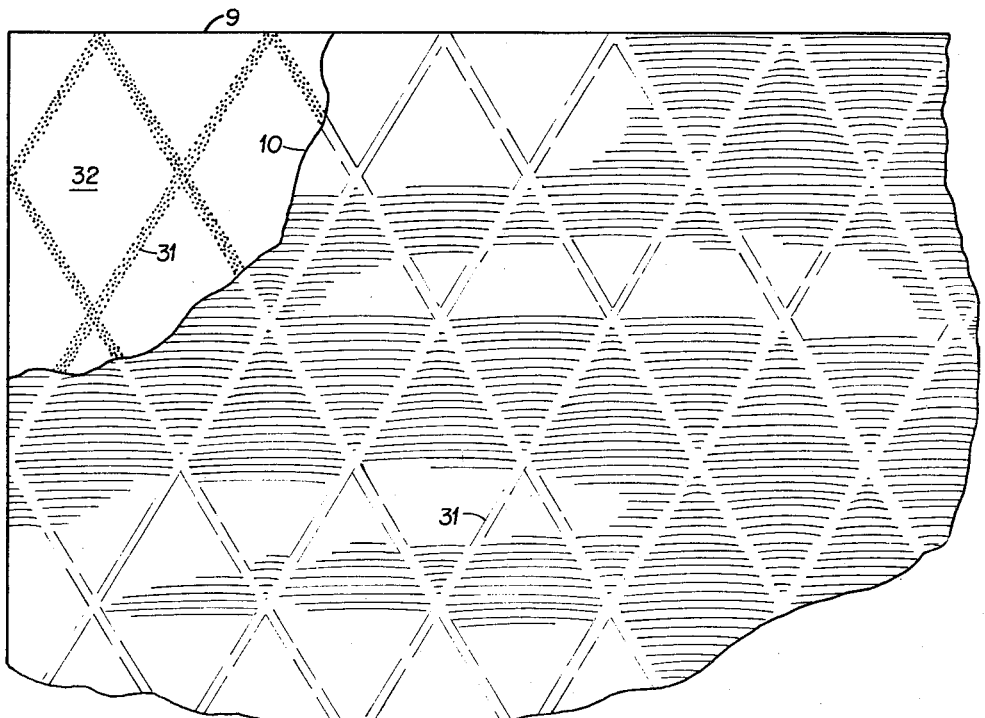

This invention relates generally to adhesively laminated kraft paper products and more specifically to adhesively laminated kraft paper material having particular use in packaging material, such as industrial wrappings and paper bags.

Paper material used in industrial wrappings necessarily must exhibit high strength since it is intended to be used where the paper material functions as a containment for loads which not only are heavy, but which frequently present jagged edges, sharp corners, or other points of high stress. Failure of the wrapping due to rupture upon being subjected to shear or bursting forces is often very costly, and can result in complete loss of the contained commodity. Paper bags, such as the common grocery bags and shopping bags, are required to withstand particularly high and irregular loading stresses. Further, inasmuch as wrapping paper, paper bags and the like are usually not reused, it is economically necessary that the wrapping material of high strength be made at relatively low cost.

It is therefore an object of this invention to provide an adhesively laminated kraft paper product, especially useful as wrapping material, having improved strength and elongation and which also is economically advantageous.

Figure 2:
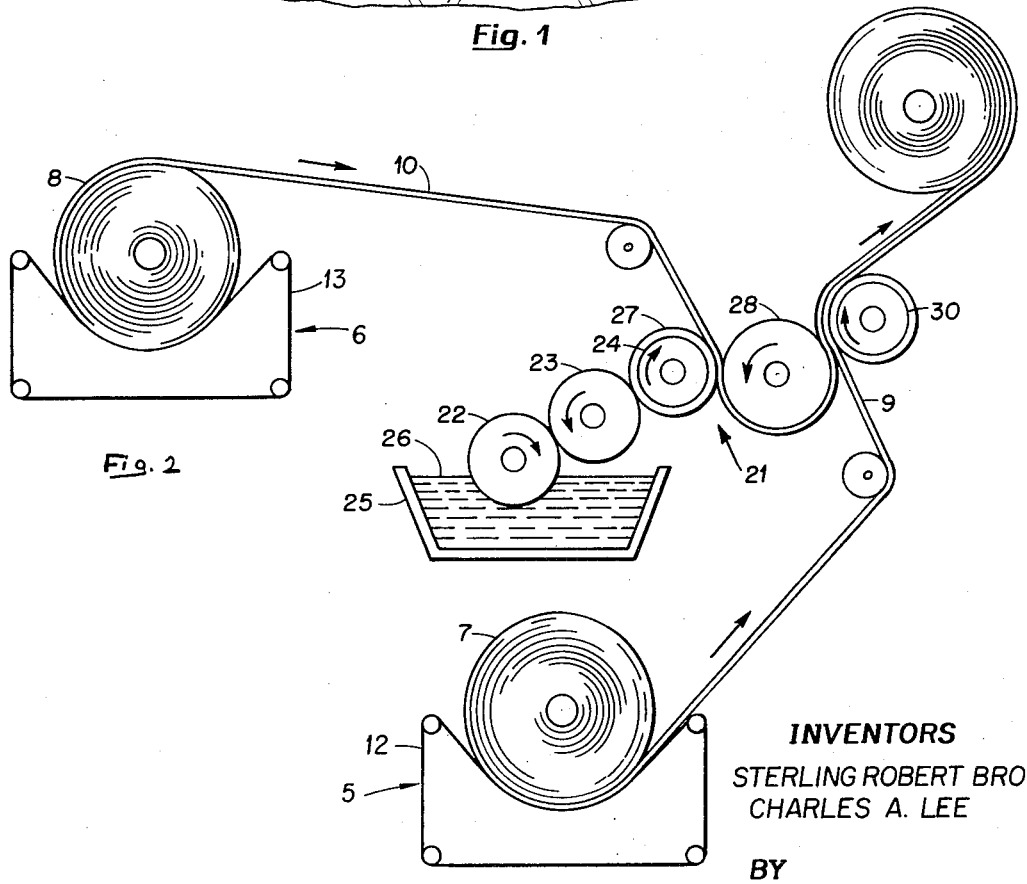

Other objects and advantages of the invention will become known by reference to the following description and accompanying drawings. In the drawings:

FIG. 1 is an illustration of one embodiment of the adhesively laminated kraft paper product of the invention with part of the product broken away to show the adhesive; and FIG. 2 is a representation of apparatus for the manufacture of the product of FIG. 1.

In general, the product of the present invention comprises two kraft paper webs bonded together in superposed relation by an adhesive disposed in a pattern between the webs and defining limited bonded regions separated by substantial unbonded regions, each web being in a different condition of stress in a common direction in the plane of the product.

In accordance with the present invention, an increase in the strength and elongation of multiple-ply kraft paper products has been found obtainable by adhesively bonding two webs of kraft paper in superposed relation with adhesive disposed between the webs in patterned lines, the two webs being bonded together while elastically stretching one of the webs to a greater degree than the other. Upon relaxation of the webs, the different degrees of web tension cause one web to contract to a greater extent than the other web, thereby establishing different conditions of stress in the webs. Preferably, tension is applied to each web parallel to its machine direction and the webs are superposed with their machine directions parallel, thereby causing the different conditions of stress in the webs to be oriented in a common direction in the plane of the laminated product. This manner of conditioning the webs has been found to produce a product whose strength and elongation to rupture are substantially greater than the strength and elongation of non-conditioned two-ply kraft paper, as will become more apparent hereinafter.

Desirably the starting materials for producing the present product include two kraft paper webs, each having a basis weight of between about 25 and 60 pounds per ream of 2880 square feet. Preferably, these webs are made of sulphate pulp originating from northern coniferous woods, especially spruce. Other lesser quality kraft pulps, such as the so-called southern kraft papers made largely from southern pines, may be used but are less desirable. It is also permissible, but less desirable to use kraft paper webs which include unbleached sulphite, and, in some cases, ground-wood pulp. Kraft colored sulphite is also acceptable in certain applications such as in paper bags. Each web normally possesses a tensile strength of about 23 pounds per inch in its machine direction and of about 10 pounds per inch in its cross direction, and elongations of about 1.6% and 2.3% in its machine and cross directions, respectively.

Referring to FIG. 1, as practiced in the present invention, the two kraft webs 9, 10 are adhesively bonded in superposition by an adhesive disposed between the webs in accordance with a pattern of lines 31 which define limited bonded regions separated by substantial unbonded regions 32. Preferably, the adhesive is of the thermoplastic resin type. One satisfactory adhesive is prepared by mixing 5 parts of polyvinyl alcohol sold commercially as COVOL 9870 by Corn Products Company of New York, N.Y., with 80 parts of water, 1 part of Triton X-100 wetting agent (distributed commercially by Rohm & Haas Company), and 0.1 part of an antifoaming agent sold by Rohm & Haas Company under the trade name of Antifoam B. In the preferred embodiment these lines of adhesive extend over the whole of the laminate, and as so distributed, the adhesive retains the webs in their superposed relation, thereby creating a unitary structure exhibiting significantly improved strength.

It is of importance to this invention that the adhesive be disposed between the webs such that the bonded regions are separated by unbonded regions of substantially greater area than the bonded regions. Achievement of this desired result has been found possible by applying the adhesive to one web in a network of intersecting or near intersecting lines, such as depicted in FIG. 1.

In the present invention the lines of adhesive bonds have been observed to function as corridors of strength which assume those stresses exerted upon the laminate in the plane of the laminate. Preferably the lines of adhesive principally extend obliquely of the machine direction of the webs so as to establish intersecting or near intersecting corridors of strength which define roughly diamond-shaped or circular patterns. These patterns have been found to impart good bidirectional strength to the laminated product, such corridors being especially effective in maintaining product strength where the product is bent, twisted, flexed or similarly manipulated during its use and wherein the webs would otherwise skew with respect to each other so as to reduce their cooperative contribution to the overall strength of the product. That is, the oriented corridors of strength aid in maintaining the unbonded portions of the web in their superposed strength-contributing attitude.

The amount of adhesive applied should be sufficient to produce the desired adhesion of the individual webs but should at the same time leave substantial unbonded regions. By concentrating the adhesive described above in lines of adhesive no greater than about 0.0625 inch in width, the adhesive is confined to definite lines. Preferably the quantity of adhesive applied is such that the webs adhere sufficiently that the fibers are pulled from the webs before the adhesive bonds break.

Differential stressing of the plied webs within the unbonded regions may be attained by differentially stretching the two webs elastically prior to bonding them into the laminate, and relaxing the webs after bonding. Control of the tensions in the respective webs as they pass through the manufacturing apparatus provides a stretch in one web greater than that in the other web. One web is stretched to just below its elastic limit, and the other web is stretched to a lesser degree. While in these states, they are superposed with lines of adhesive disposed between them, and pressure may be applied to force the adhesive into bonding relation in the webs. After the adhesive has set up, the webs are relaxed from their stretched attitudes. Both webs then contract with the web which was stretched to the greater extent prior to bonding exhibiting a greater degree of contraction. This differential contraction establishes different conditions of stress within the webs, such effect occurring within each unbonded region. Repetition of the effect over the entire laminated product creates a product having a plurality of islands of differential stress whose perimeters are defined by lines of adhesive isolating each unbonded region from the others and substantially reducing the possibility of a failure in one region extending into another. The differential contraction produces a quilted effect, adding bulk to the resultant product and acting to cushion impacts and localized forces.

Unbonded regions encompassing an area of at least about ½ square inch but less than about 3 square inches each have been found satisfactory to provide the desired effective area for differential stressing of the webs and also provide sufficient corridors of strength per unit area of product as will assist in developing the desired characteristics of product strength and elongation.

Referring now to FIG. 2, apparatus for the manufacture of the present laminated kraft paper product includes a pair of unwind stands 5 and 6, each designed to dispense continuous webs of kraft paper from rolls 7 and 8. Preferably within the unwind stands, the rolls of paper are supported on continuous belts 12, 13 the movements of which turn rolls 7 and 8 at respective speeds, thereby paying out the paper webs 9 and 10, respectively, at respective speeds.

The first paper web 10 is dispensed from roll 8 to an adhesive laminating apparatus 21 which includes a fountain roll 22, a transfer roll 23 and a pattern or plate roll 24. The fountain roll 22 is partly immersed in a tank 25 of liquid adhesive 26. It rotates in the adhesive 26 and carries adhesive to the nip between rolls 22 and 23 where the adhesive is transferred in a metered amount to the transfer roll 23. The amount of adhesive transferred to the roll 23 is controlled by the pressure between the rolls 22 and 23. The pattern roll 24 is preferably constructed of steel and has a rubber impression mat 27 provided on its surface. This impression mat 27 has portions of its surface raised in accordance with the desired adhesive pattern. As the pattern roll 24 rotates in contact with transfer roll 23, a controlled quantity of adhesive is transferred to the raised portions at the points of contact. The first paper sheet 10 is passed through the nip between the plate roll 24 and a steel impression roll 28. As the web 10 passes through the nip, the adhesive is transferred from the raised portions of the mat 27 to the web 10, thus depositing the adhesive on the web 10 in the same pattern. The adhesive is laid down in an open pattern of lines separated by relatively large adhesive free regions. The second paper web 9 is dispensed from the roll 7 and directed to overlie the first web 10. A portion of the adhesive is thereupon transferred to the second web 9. The adhesive has partially set up as the two webs 9 and 10 with the patterned adhesive therebetween are passed through a nip between the impression roll 28 and a second pattern or plate roll 30 having a pattern of raised portions corresponding to the pattern of the pattern roll 24 and driven in registry with the pattern roll 24. In the nip between the impression roll 28 and the second pattern roll 30, pressure is applied substantially only to the adhesive bearing regions, forcing the partially set up adhesive into bonding relation in the two webs 9 and 10.

In order that the webs of the resulting laminate may be in different conditions of stress in the course of passing through the laminating apparatus 21, each paper web 9, 10 is subjected to respective tensioning forces in the plane of the web. The tension applied to each web during its passage through the apparatus determines the degree to which the web is stretched at the time the webs are bonded. The magnitude of this stretch is established by selective adjustment of the relative speeds of the unwind stands 5, 6 and the rolls of the adhesive laminating apparatus 21. By selective adjustment of the hold-back forces of rolls 7, 8 the tension in the second web 9 and hence the stretch in web 9 are made greater than the tension and corresponding stretch in the first web 10 as the two webs are adhesively laminated. In a preferred operation, web 9 will be fed forwardly at a rate of between about ¼% to ¾% slower than web 10. Upon release of the tension in the webs after they leave the nip between rolls 28 and 30, the webs contract, establishing different conditions of stress in the respective webs.

EXAMPLE I

Following the procedures set forth above, two separate webs of kraft paper, each having a basis weight of 40 pounds per ream of 2880 square feet were fed from rolls 7, 8 at different rates. Each web had a tensile strength of 23 pounds per inch and an elongation of 1.6% in its machine direction. In its cross direction, each web had a tensile strength of 10 pounds and an elongation of 2.3%. One of the webs was directed through the nip between the impression roll 28 and the pattern roll 24 having its surface covered by a rubber impression mat 27 patterned as depicted in FIG. 1. The raised pattern of this mat extended to a height of 0.045 inch from the mat surface. Each pattern line was about 0.0625 inch wide. Polyvinyl alcohol adhesive in the formula described above was applied to web 10 as it passed between the impression roll 28 and the pattern roll 24.

Following application of the adhesive to the web 10, the second web 9 was overlaid on the web 10 with the patterned adhesive between the webs. The adhesive had partially set up as the webs 9 and 10 with adhesive therebetween were passed through the nip between a smooth-surfaced, impression roll 28 and the matching pattern roll 30, where sufficient pressure was applied to force the partially set up adhesive into bonding relation, hence joining the webs into a two-ply laminate. In this operation, the second web 9 was supplied at a rate of about ½% slower than the first web 10, thus stretching the former web more than the latter.

The tensile strength and elongation of the laminated product were examined using a Hounsfield Tensometer. The results of these tests are given in Table I. The tensile strength and elongation exhibited by two layers of the same kraft paper as used in making the laminated product are also given in Table I for purposes of comparison.

TABLE I

| | Tensile strength (lbs. per inch) | Elongation to rupture (percent) |
|---|---|---|
| Laminated product: | | |
| Machine direction | 57.5 | 6 |
| Cross-machine direction | 24.5 | 9 |
| Two layers of kraft: | | |
| Machine direction | 30 | 4 |
| Cross-machine direction | 22 | 6 |

From Table I it is noted that the tensile strength of the present laminated product is approximately twice the strength of the two untreated layers of kraft paper, indicating approximately a 100% increase in tensile strength as a consequence of the treatment given the paper webs in accordance with the present invention. Consequently, the present invention provides a method for greatly increasing the strength of existing kraft wrapping papers or, alternatively, for producing an equivalent wrapping paper material using kraft paper having a lesser basis weight, and hence at lower cost without loss of strength or elongation.

The product was subjected to shock forces, including puncture-type forces, and was observed to withstand considerably greater forces than two unbonded layers of the same kraft paper. Especially, the product exhibited limited propogation of tears deliberately induced during testing. These tears, when produced by pointed objects such as a box corner, tended to be self-limiting to the unbonded islands at the point of initial rupture, indicating the capability of the product to absorb impact.

Various modifications may be made within the scope of the invention. For example, the webs 9 and 10 may be passed through the adhesive laminating apparatus 21 in other paths. The web 10 may be passed through the nip between the transfer roll 23 and the pattern roll 24, and the web 9 may be overlaid at the nip between the pattern roll 24 and the impression roll 28. Other patterns of adhesive may be used. Various features believed to be novel are included in the following claims.

What is claimed is:

1. An adhesively laminated kraft product comprising two superposed kraft paper webs, and adhesive disposed between said webs in a pattern bonding said webs together in limited regions, each web being in a different condition of stress in a common direction in the plane of the product.

2. A product in accordance with claim 1 wherein said adhesive is disposed in a pattern of lines disposed about substantial unbonded regions of the webs.

3. A product in accordance with claim 2 wherein each unbonded region is isolated from the others by said lines of adhesive.

4. A product in accordance with claim 3 wherein each of said unbonded regions is between about 1 and 3 square inches.

5. A product in accordance with claim 2 wherein said lines of adhesive are continuous.

6. An adhesively laminated kraft product comprising first and second kraft paper webs each having a basis weight of about 25 to 60 pounds per 2880 square feet, and adhesive disposed between said first and second webs in a pattern bonding said webs together in limited regions disposed about substantial unbonded regions, each web being in a different condition of stress in a common direction in the plane of the product, and the laminate having a tensile strength of at least about 35 pounds per inch in said common direction with an elongation to rupture of at least about 4.5% in said common direction.

References Cited

UNITED STATES PATENTS

| | | | |
|---|---|---|---|
| 3,214,323 | 10/1965 | Russell et al. | 156—291 |
| 3,546,056 | 12/1970 | Thomas | 161—129 |
| 3,316,136 | 4/1967 | Pufahl | 161—76 |
| 2,792,326 | 5/1957 | Doyle et al. | |
| 3,269,643 | 8/1966 | McDowell. | |

ROBERT F. BURNETT, Primary Examiner

L. KOECKERT, Assistant Examiner

U.S. Cl. X.R.

156—163, 291